United States Patent Office 3,480,627
Patented Nov. 25, 1969

3,480,627
PREPARATION OF TRIALKENYL ISOCYANURATES
Dietrich H. Heinert, Midland, Mich., assignor to The Dow Chemical Company, Midland, Mich., a corporation of Delaware
No Drawing. Filed Oct. 26, 1966, Ser. No. 589,537
Int. Cl. C07d 55/38; C08f 7/12
U.S. Cl. 260—248         10 Claims

ABSTRACT OF THE DISCLOSURE

The corresponding trialkenyl isocyanurate is obtained by reacting cyanuric acid with acetylene or methylacetylene at 150–225° C. in an inert solvent medium in the presence of a zinc or cadmium catalyst which may include an organic tertiary nitrogen base. The trialkenyl isocyanurate product is convertible by vinyl polymerization techniques to chemically inert, heat resistant polymers.

The present invention concerns a new and advantageous method for vinylating cyclic polyimides by reaction with an acetylene. It concerns particularly this process as applied to the vinylation of cyanuric acid by reaction with acetylene or methylacetylene to obtain the corresponding tri(1-alkenyl)isocyanurate.

Tri(1-alkenyl)isocyanurates are valuable monomers which can be homopolymerized by conventional vinyl polymerization techniques to provide polymers which are chemically inert and particularly resistant to high temperatures. Trivinyl isocyanurate has previously been prepared by trimerization of vinyl isocyanate in the presence of a tertiary amine or phosphine. However, this known method requires relatively expensive reactants and it involves a multi-step procedure.

It has now been found that tri(1-alkenyl) isocyanurates can be prepared by a one-step process using cheap and readily available starting materials. This novel process comprises reacting acetylene or methylacetylene with cyanuric acid in the presence of a solvent and a metal catalyst consisting essentially of a zinc compound, a cadmium compound, or a mixture thereof, the reaction being carried out within a temperautre range of 150–225° C. Under preferred conditions, the reaction mixture is substantially a homogeneous solution and the gaseous acetylene is absorbed as it reacts with relative rapidity. Preferably, the acetylene is supplied at superatmospheric pressure to speed the reaction, whereupon reaction times of 5–50 hours are usually sufficient. The process is operable but the reaction is slower at atmospheric pressure. Acetylene pressures up to about 60 atmospheres can be used with suitable precautions. Apparently the reaction proceeds directly to the formation of tri(1-alkenyl) isocyanurate and little or no monovinylated or divinylated material is found in the reaction product. For most efficient operation, about 3-4 moles of acetylene or methylacetylene are employed per mole of cyanuric acid.

The products of this process are the trisubstituted isocyanurates wherein the 1-alkenyl groups are attached to the three nitrogen atoms in the isocyanuric acid structure (see the formulas below). Vinylation with acetylene yields trivinyl isocyanurate while the vinylation with methylacetylene produces a mixture of the four possible tri(1-alkenyl) isocyanurates wherein the 1-alkenyl substituents are isopropenyl radicals, propenyl radicals, or a mixture of the two. The vinylating reactant can also be a mixture of acetylene and methylacetylene, in which case there are formed isocyanurates having both two carbon and three carbon 1-alkenyl substituents on the same molecule.

Amides and imides are known to react with acetylene in the presence of basic catalysts such as alkali metal hydroxide or alcoholate, alkaline earth hydroxide, or alkali metal nitrogen compound such as the potassium salt of pyrrolidinone. Zinc and cadmium compounds have been used as activators or cocatalysts in combination with such alkaline catalysts. Organic bases such as pyridine and quinoline have also been used with these materials as auxiliary catalysts for the vinylation reaction. Imides, particularly cyclic imides have also been vinylated by reaction with acetylene in the presence of mercuric salts.

The structure of cyanuric acid makes this compound a special case in terms of chemical reactivity. Cyanuric acid exists in two forms as shown by the equilibrium:

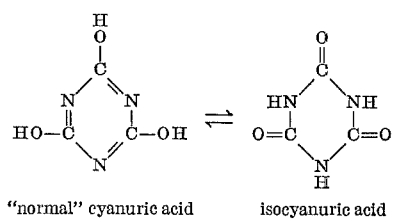

"normal" cyanuric acid      isocyanuric acid

Therefore, it can be considered not only as a cyclic imide, but also as a trihydroxy triazine with aromatic characteristics. Derivatives of both forms are well known. The fact of its difference in reactivity is demonstrated by the failure of the above listed known catalysts and catalyst combinations for imide vinylation when these known catalysts are applied to the reaction of acetylene or methylacetylene with cyanuric acid. Alkali metal bases, whether employed alone or in combination with an activator or auxiliary catalyst as described above, appear actually to be non-catalysts or even poisons for the present reaction. Similarly, little or no vinylation of cyanuric acid is obtained in the presence of a mercuric salt catalyst. Therefore, the unique catalytic efficacy of zinc and cadium compounds in the present system is surprising and not to be expected from the experience of the prior art.

Zinc or cadmium as free metal or any compound or mixture thereof can be used to catalyze this vinylation reaction. Zinc compounds are preferred. It is thought that the metal compound reacts with the cyanuric acid to form a soluble metal isocyanurate which then serves as the active catalyst. Since the free metals themselves are dissolved to some extent under reaction conditions, these can also be used to catalyze the reaction although they are not usually preferred. The zinc and cadmium catalysts fall into two main categories which include as representative members:

(I) The free metals, their oxides, hydroxides, alkoxides, amides, hydrides, cyanates, cyanurates, and carbonates. The compounds of this group can be regarded as salts of very weak acids, i.e., acids having an ionization constant at 25° C. less than $10^{-6}$. The zinc and cadmium salts of cyanic acid and cyanuric acid are particularly preferred substrate-related catalysts which constitute a sub-group within this category.

(II) Salts of acids significantly stronger than cyanuric acid, i.e. acids having an ionization constant of at least $10^{-6}$ at 25° C. These include the zinc and cadmium salts of sulfuric, nitric, phosphoric, hydrochloric, acetic, propionic, benzoic, and oxalic acids, for example.

The cyanates and cyanurates of zinc and cadmium are particularly preferred catalysts because these salts introduce no foreign anion into the reaction mixture. Monohydrogen and dihydrogen metal cyanurates as well as the tribasic salts are possible. These are equivalent as catalysts.

The first of the above categories includes substances which can form soluble metal cyanurates in the reaction mixture without significant interference in the process by the liberated byproduct. Therefore, these are active and preferred catalysts which can be used effectively as such. However, their efficiency is often improved when they are used in combination with an organic tertiary nitrogen base. Such bases include trialkylamines, for example, triethylamine, N,N-dimethylbutylamine, trihexylamine, and tribenzylamine; N-alkyl alicyclic heterocycles such as N-methylpyrrole, 1,4-dimethylpiperazine, and N-methylmorpholine; and aromatic heterocycles such as pyridine, 2,2-bipyridyl, quinoline, and their alkylated derivatives.

Particularly preferred are the complexes of defined chemical composition which have been found to be formed upon mixing zinc or cadmium cyanurates or cyanates with a tertiary nitrogen base as defined above. Such complexes have the advantage of being completely soluble in the reaction mixture at ordinary temperatures. Completely homogeneous reaction mixtures are thereby prepared at room temperature with considerable advantage in measuring and handling. Such catalyst complexes are also more efficient in providing faster reaction rates with little or no induction period, thereby shortening reaction times significantly. Improved yield and higher product purity are other advantages often obtained with these catalyst systems.

The catalysts of the second category are less atcive. Although operable alone, they are preferably employed with a tertiary nitrogen base as defined above. When so used, these salts are of the same order of activity as the catalysts of the other category.

The quantity of metal catalyst is not critical to operability of the process, since any significant amount will catalyze the vinylation reaction. Optimum reaction rates and yields are obtained by using sufficient zinc or cadmium catalyst to provide 0.02–1 atom of metal per mole of cyanuric acid.

Similarly, any proportion of organic tertiary nitrogen base cocatalyst in the reaction mixture will usually be found to have some beneficial effect. It is preferred to use 0.1–1 mole equivalent of such base per equivalent of metal catalyst.

The reaction is carried out in the liquid phase and necessarily in the presence of a solvent since cyanuric acid is a solid at reaction temperatures. The solvent can be employed in any quantity sufficient to dissolve at least a substantial part of the cyanuric acid starting material under reaction conditions. Any organic solvent which is stable and unreactive under the conditions of the reaction can be used. Such solvents include those known to be suitable reaction media for the thermal condensation of urea to cyanuric acid and which are also unreactive with acetylene under reaction conditions. These include dialkyl sulfones, alicyclic sulfones, saturated aliphatic, and cycloaliphatic hydrocarbons, aromatic hydrocarbons, and organic tertiary amides. A preferred class of solvents comprises organic tertiary amides of carboxylic, phosphoric, or sulfonic acid. Particularly preferred are the N,N-di(lower alkyl) amides of alkanoic acids of 1–3 carbon atoms, N- lower-alkyloxazolidinones and their hydrocarbon substituted derivatives, which amides are known to be useful in the conversion of urea to cyanuric acid. Tertiary amides such as dimethylformamide, N,N-dimethyl-acetamide, 3-methyl-5-phenyl-2-oxazolidinone, 1-methyl-2-pyrrolidinone, and the like are representative. Other tertiary amides such as tetramethylurea and hexamethyl phosphoric triamide can also be used.

The process can be carried out in either continuous or batchwise manner. Since preferred operation is under superatmospheric pressure, equipment and procedure adapted to the use of acetylene under pressure are mandatory for such operation. For example, the acetylene feed may be diluted with an inert gas such as ethane, propane, carbon dioxide, or nitrogen to reduce the danger of explosive decomposition. The reaction product is essentially a solution of tri(1-alkenyl) isocyanurate in the solvent together with more or less soluble components such as the metal catalyst, unreacted cyanuric acid, any amine cocatalyst used, and resinous or tarry byproducts. The isocyanurate can be separated by any conventional procedure such as distillation or solvent extraction. The metal catalyst can be recovered and recycled for repeated use.

EXAMPLE 1

A slurry of 129.1 g. of cyanuric acid, 32.4 g. of zinc oxide, and 1300 ml. of dry N,N-dimethylacetamide was put in a 3000 ml. capacity shaking autoclave filled with small diameter stainless steel tubes. The autoclave and the connected high pressure acetylene feed system were flushed several times with acetylene at 150 p.s.i.g. The autoclave was then shut off from the feed system and heated to 185° C. The reaction mixture was then saturated with acetylene at 200 p.s.i.g. and acetylene was continuously admitted at this pressure and at a reactor temperature of 185° C. for 18 hours. The acetylene supply was then shut off and the autoclave was allowed to cool to room temperature. Gas chromatographic analysis of the filtered reaction mixture indicated a content of 8.1 weight percent of trivinyl isocyanurate in the volatile material, corresponding to a total yield of 58.8% of the theoretical quantity based on the starting cyanuric acid. A small quantity of dinitro-o-cresol was added to the mixture as a stabilizer and most of the solvent was distilled off at 10 mm. Hg on a water bath. The oily residue was mixed with 150 ml. of a silicone oil as a distillation heel and the whole was fractionally distilled at less than 1.0 mm. Hg to obtain a trivinyl isocyanurate fraction distilling at 90–110° C. and 0.2–0.5 mm., a lemon yellow oil containing some of the dinitro-o-cresol stabilizer. The stabilizer was separated by diluting the fraction with carbon tetrachloride, filtering the solution through a column packed with dry activated alumina, and removing the solvent under reduced pressure. Pure trivinyl isocyanurate, weight 83.9 g., was obtained as a clear pale yellow oil. Upon cooling, the compound solidifies to white crystals melting at 33–35° C. The liquid compound had a density of 1.234 at 35° C., B.P. 148° C. at 1 mm. Hg. It was found to be identical with a sample of trivinyl isocyanurate obtained by trimerization of vinyl isocyanate.

EXAMPLE 2

A mixture of 12.9 g. of cyanuric acid, 3.2 g. of zinc oxide, and 5.2 g. of quinoline in 90 ml. of N,N-dimethylacetamide was vinylated in a 180 ml. shaking autoclave filled with small stainless steel tubes by treatment with acetylene at 200 p.s.i.g. for 21 hours at 180° C. according to the procedure described in Example 1. The acetylene absorption was 120% of that theoretically required for conversion of all of the cyanuric acid to the trivinyl derivative. Vapor phase chromatographic analysis and mass spectral analysis both indicated a content of 16.7 g. of trivinyl isocyanurate in the reaction mixture. This represents a yield of 80.7% of the trivinyl isocyanurate theoretically obtainable from the starting cyanuric acid.

EXAMPLE 3

In the apparatus of Example 1, a mixture of 51.4 g. of CdO, 129.1 g. of cyanuric acid, and 1300 ml. of N,N-dimethylacetamide was pressured at room temperature with acetylene at 100 lbs. gauge pressure for two hours, at which time the mixture was essentially saturated. The acetylene supply was then shut off and the reactor was heated to 182° C. and was maintained at this temperature for 21 hours. A gauge pressure maximum of 800 lbs. was reached at 3 hours and the pressure then declined to a final value of 490 lbs. The reaction mixture was extracted with carbon tetrachloride and the extract was distilled to recover 76.6 g. of trivinyl isocyanurate. The extracted reaction mixture contained the metal salt catalyst. By working up this mixture to recover the metal salt, the recovered salt can be recycled and used effectively to catalyze another vinylation of cyanuric acid.

When the above reaction procedure was repeated twice substituting 86.6 g. of HgO and 103.0 g. of $Hg_3(PO_4)_2$ respectively for the cadmium oxide, no trivinyl isocyanurate was found in either final reaction mixture.

EXAMPLE 4

According to the procedure described in Example 2, a mixture of 12.9 g. of cyanuric acid, 1.84 g. of zinc acetate, and 0.79 g. of pyridine in 98 ml. of N,N-dimethylacetamide was heated for 21 hours at 180° C. and 200 p.s.i.g. acetylene pressure. Vapor phase chromatographic analysis of the reaction mixture showed a total yield of 66.8% of trivinyl isocyanurate based on the starting cyanuric acid.

EXAMPLE 5

Upon repeating Example 4 except for using twice the quantity of zinc acetate and no pyridine, the yield of trivinyl isocyanurate was found to have dropped to 10 percent.

EXAMPLE 6

As described in Example 2, a mixture of 12.9 g. of cyanuric acid and 4.48 g. of zinc hydrogen cyanurate in 100 ml. of N,N-dimethylacetamide was heated for 21 hours, at 180° C. and 200 p.s.i.g. acetylene pressure. Analysis of the product as before showed a yield of 36.5 percent of the theoretical trivinyl isocyanurate based on the starting free cyanuric acid.

When this procedure was repeated using 2.43 g. of dipotassium hydrogen cyanurate in place of the zinc hydrogen cyanurate, no trivinyl isocyanurate could be found in the product.

EXAMPLE 7

Following the procedure of Example 3, a mixture of 129.1 g. of cyanuric acid and 44.8 g. of zinc cyanate in 1300 ml. of N,N-dimethylacetamide was saturated at room temperature with acetylene at 100 p.s.i.g. and the saturated mixture was heated for 10 hours at 182° C. A pressure maximum of 810 p.s.i.g. declined to 400 p.s.i.g. at the end of the heating period. Vapor phase chromatographic analysis of the product showed a nearly theoretical yield of trivinyl isocyanurate. Extraction of the product with carbon tetrachloride and distillation of the extract yielded 108.7 g. of pure trivinyl isocyanurate.

A similar experiment wherein the zinc cyanate was replaced by 32.5 g. of potassium cyanate yielded a reaction mixture containing only traces of trivinyl isocyanurate.

EXAMPLE 8

By the procedure described in Examples 3 and 7 a mixture of 129.1 g. of cyanuric acid and 92.3 g. of a zinc cyanate-pyridine complex (2 molecules of pyridine per molecule of zinc cyanate) in 1300 ml. of N,N-dimethylacetamide was saturated with acetylene at 100 p.s.i.g. acetylene pressure and then heated for 11 hours at 177° C. Analysis of the product showed about a theoretical yield of trivinyl isocyanurate. Solvent extraction and distillation produced 96.7 g. of the pure compound.

Vinylation of cyanuric acid with methylacetylene produces a mixture of compounds since methylacetylene can undergo substitution at either of the carbon atoms connected by the acetylenic bond. Reaction at the central carbon atom is the preferential mode of attack but substantial reaction at the terminal carbon atom also occurs. Therefore, triisopropenyl isocyanurate is the major product of this reaction, but the other three possible compounds are also formed in significant quantity as shown in the following example.

EXAMPLE 9

The reactor of Example 2 was charged with a reaction mixture of 0.075 g. mole of cyanuric acid, 0.03 g. mole of zinc oxide, and 100 ml. of N-methylpyrrolidinone. The reactor was degassed and 0.34 g. mole of liquefied methylacetylene was distilled into the reactor under reduced pressure while the reactor was cooled by a Dry Ice bath. The reactor was then sealed, warmed to room temperature, and then heated at 195–200° C. for 24 hours with agitation.

The solvent was distilled from the reaction mixture under reduced pressure and the residue was extracted with 250 ml. of carbon tetrachloride to obtain an insoluble tar and a brown solution. The filtered solution was distilled under reduced pressure to remove the solvent and this residue was subjected to vapor phase chromatographic separation to isolate the isomeric compounds contained in it.

The major product was found to be triisopropenyl isocyanurate which was separated in 8.8 percent yield based on the starting cyanuric acid. This compound was a white crystalline solid melting at 163–166° C. It was identified as the named compound by its infrared spectrum, mass spectrum, and nuclear magnetic resonance spectrum.

Also isolated as white crystalline solids were diisopropenyl propenyl isocyanurate in about 6 percent yield and isopropenyl dipropenyl isocyanurate in about 4 percent yield. These compounds were identified by their infrared and mass spectra. In addition, there was also present in the mixture tripropenyl isocyanurate in a smaller yield of the order of one percent.

The cyanuric acid used as a starting material in the examples of this process can be obtained advantageously by any of the known processes. Particularly advantageous is a process for condensing urea by heating in a cyclic or acyclic tertiary amide solvent as described in United States Patents 3,164,591 and 2,872,447. When cyanuric acid is made according to such a process, it is obtained as a solution or suspension in a tertiary amide type solvent and the process of vinylation as described in this invention is carried out directly with such a solution or suspension of cyanuric acid by simply adding catalyst and subjecting this mixture to the vinylation conditions described above. By carrying out the process in this way, the ordinarily necessary steps of isolating and purifying cyanuric acid can be eliminated. A yield of tri(1-alkenyl) isocyanurate similar to those shown in the above examples is obtained.

I claim:

1. A process for making a trialkenyl isocyanurate which comprises reacting cyanuric acid with acetylene, methylacetylene, or a mixture thereof at 150–225° C. in the presence of an inert organic solvent and a catalyst which is zinc, a zinc compound, cadmium, a cadmium compound, a mixture thereof, or a mixture thereof with an organic tertiary nitrogen base.

2. The process of claim 1 wherein the solvent is a tertiary amide.

3. The process of claim 1 wherein the acetylenic reactant is contacted with the cyanuric acid under superatmospheric pressure.

4. The process of claim 1 wherein the catalyst is a zinc compound in a quantity of 0.02–1 atom of zinc per mole of cyanuric acid.

5. The process of claim 4 wherein the zinc compound is zinc cyanate, zinc cyanurate, or a mixture thereof.

6. The process of claim 1 wherein the catalyst includes an organic tertiary nitrogen base.

7. The process of claim 6 wherein the catalyst is zinc cyanate, zinc cyanurate, cadmium cyanate, cadmium cyanurate, or a mixture thereof present as a complex with an organic tertiary nitrogen base.

8. The process of claim 7 where the catalyst is a complex of a zinc salt.

9. The process of claim 1 wherein the acetylenic reactant is acetylene.

10. The process of claim 1 wherein the acetylenic reactant is methyl acetylene.

References Cited

UNITED STATES PATENTS

| | | | |
|---|---|---|---|
| 2,977,371 | 3/1961 | Dixon | 260—248 XR |
| 3,075,979 | 1/1963 | Tazuma et al. | 260—248 |

FOREIGN PATENTS 912,563  12/1962  Great Britain.

OTHER REFERENCES

Frazier et al., J. Org. Chem., vol. 25, pp. 1944–6 (1960).

HENRY R. JILES, Primary Examiner

J. M. FORD, Assistant Examiner

U.S. Cl. X.R.

260—77.5